July 30, 1957

R. B. JOHNSON 2,801,343

DOCUMENT READING DEVICE

Filed Dec. 5, 1952

INVENTOR
REYNOLD B. JOHNSON
BY
ATTORNEY

July 30, 1957 R. B. JOHNSON 2,801,343
DOCUMENT READING DEVICE
Filed Dec. 5, 1952 8 Sheets-Sheet 3
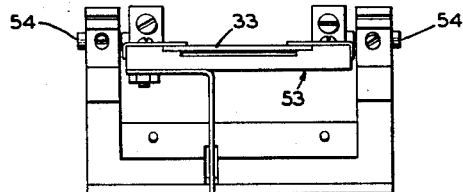
FIG. 4.
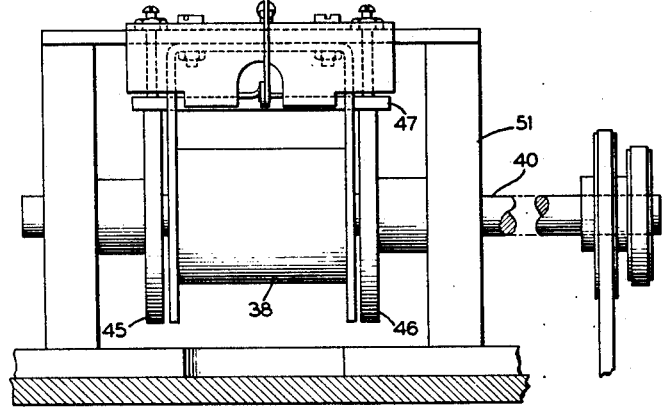
FIG. 7.
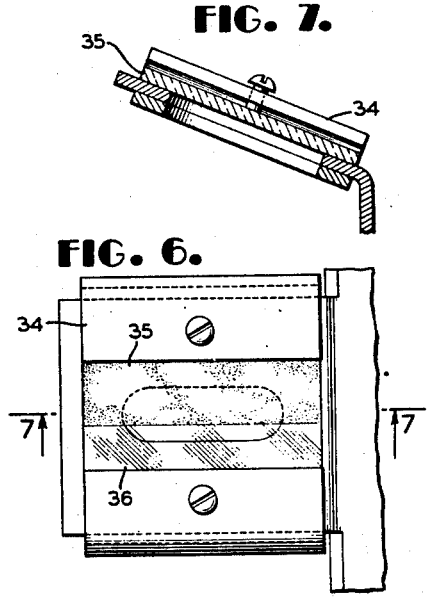
FIG. 5.
FIG. 6.
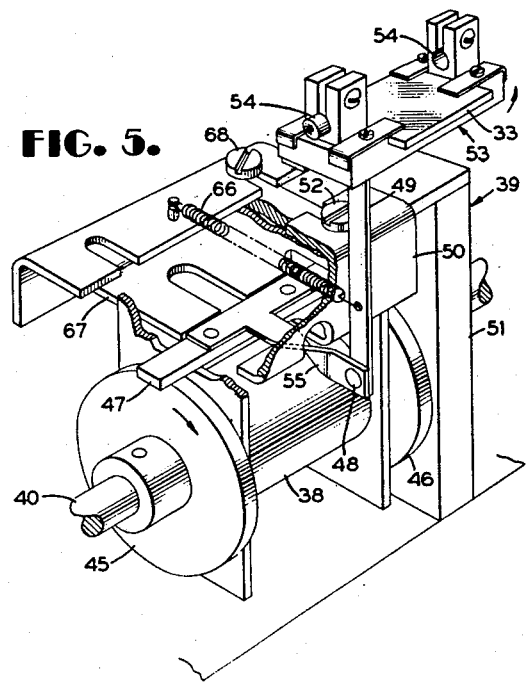
INVENTOR
REYNOLD B. JOHNSON
BY
ATTORNEY July 30, 1957 R. B. JOHNSON 2,801,343
DOCUMENT READING DEVICE Filed Dec. 5, 1952 8 Sheets-Sheet 8

Inventor
REYNOLD B. JOHNSON

By J. Jancin Jr.
Attorney

United States Patent Office 2,801,343
Patented July 30, 1957

2,801,343
DOCUMENT READING DEVICE

Reynold B. Johnson, Palo Alto, Calif., assignor to International Business Machines Corporation, New York, N. Y., a corporation of New York Application December 5, 1952, Serial No. 324,374

17 Claims. (Cl. 250—234)

This invention relates to record reading devices in general, and more particularly to devices for reading records having discrete data designations thereon.

The preferred and illustrative embodiment of the present invention is intended for use as a device to read a record having conventional data and related code symbols thereon such as may be prepared in a typewriting machine described in the R. B. Johnson Patent No. 2,749,985 which issued on June 12, 1956. For the purpose of this specification, the record to be read by the aforementioned embodiment is a paper tape having successive columns of information in the form of pierced holes along its length.

The reading of perforate and imperforate data on record cards and tapes, and the translation thereof into electrical impulses and mechanical movements has been successfully accomplished. However, it appears that for the most part apparatus and methods used heretofore to read documents as distinguished from record cards and the like, e. g., the well-known 80 column IBM record cards, have features which render them commercially impractical. This is due to the fact that some earlier reading devices require accurate placement of the printed matter on the record and thereby render the use of a typewriter or similar recording machine non-feasible, it being a well-known fact that such printing devices sometimes print the characters slightly out of position, either horizontally or vertically, with respect to the record. Other earlier record reading devices require relatively large code symbols which detract from the appearance of the record.

The present invention proposes to overcome the difficulties of prior record reading devices by providing a reading device which will read code symbols correctly regardless of irregularity in the horizontal or vertical disposition of the symbols; a reading device which will read code symbols consisting of extremely small data designations that will not deface the document; a reading device which will afford virtually error-proof operation. Irregularity in horizontal or vertical disposition is not intended to include complete displacement of the code symbol from its allotted position but refers to such misalignment as may occur when printing means such as a typewriter is used to print the record.

Accordingly, one object of this invention is to provide an improved record reading device.

In the preferred embodiment of this invention, extremely small pierced hole code symbols are used to control the energization of light sensitive elements by energy transmitted from a light source. As a code symbol is divided into a plurality of index positions and one key position, each position controls the energization of a corresponding light sensitive element. The index positions of a code symbol are arranged to either prevent or permit the energization of light sensitive elements associated therewith so as to conform with a code configuration set up to differentiate between different symbols. When the key position of a code symbol permits the energization of its corresponding light sensitive element, the image of the code symbol is in register with the said elements and a code symbol storage means is rendered responsive to the light sensitive elements that are energized.

A device such as a punching machine adapted to perforate record cards, for example, may be associated with the storage means to translate the setting of the storage means into an energization of a work controlling circuit.

Accordingly, another object of this invention is to provide improved means for sensing data manifesting radiations.

A more specific object of this invention resides in the provision of means for accurately reading extremely small data designations.

Another object of this invention resides in the provision of improved means for effecting the correct reading of code symbols regardless of irregularity in the horizontal or vertical disposition of the symbols.

A still further feature and object of this invention is to provide an improved device for reading a continuously advancing record in which optical scanning is utilized to effect correct reading of each of successive code symbols regardless of irregularity in the horizontal or vertical disposition of the symbols.

Another object of this invention is to provide an improved optical system for analyzing data designations on a record.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 4 is a cross sectional view along the plane 4—4 of Fig. 1.

Fig. 5 is a perspective view of the sweep magnet assembly and sweep mirror.

Fig. 6 is a cross sectional view along the plane 6—6 of Fig. 1.

Fig. 7 is a cross sectional view along the plane 7—7 of Fig. 6.

Figure 9A:
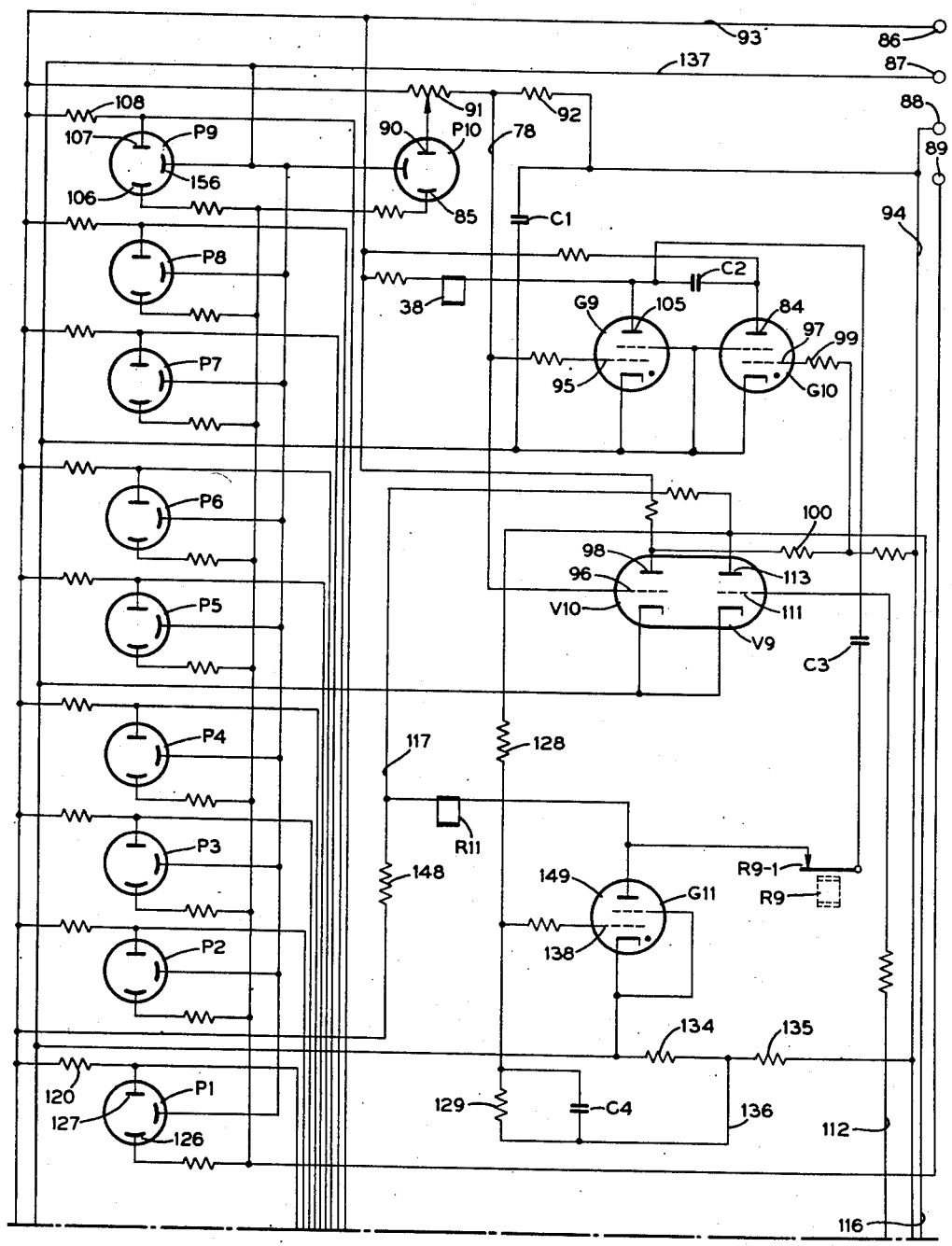
Figure 9B:
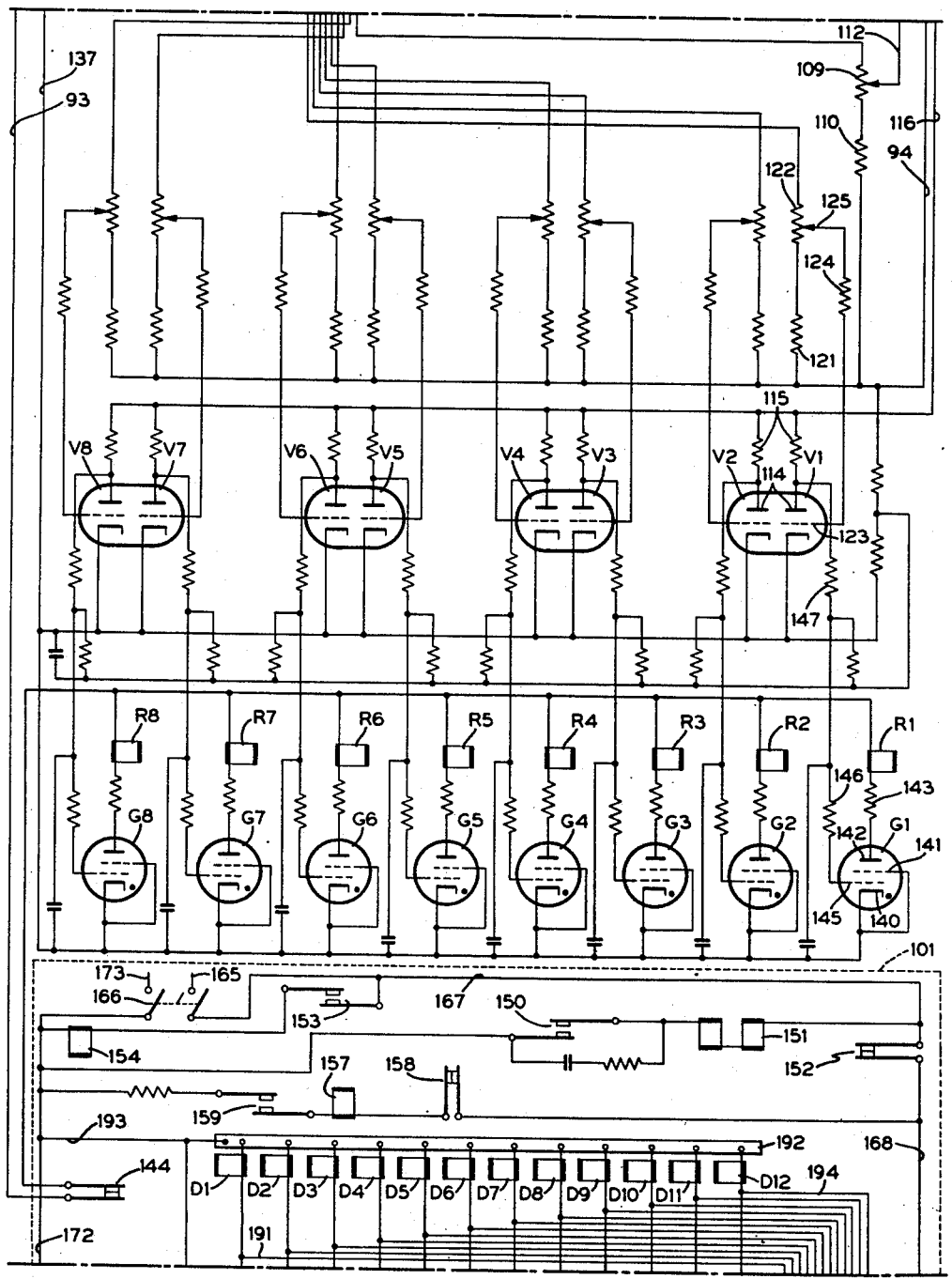
Figure 9C:
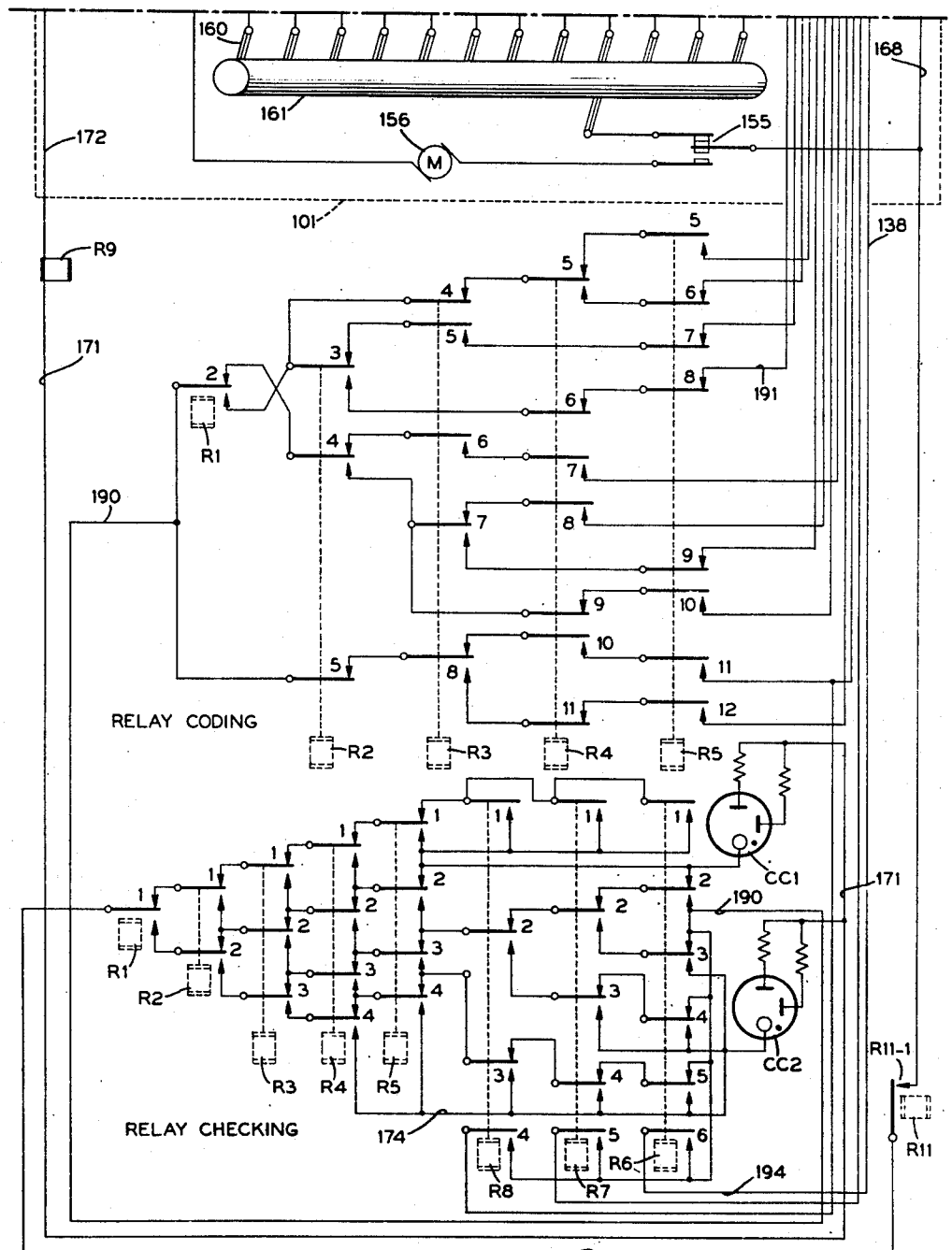

Figs. 9a, 9b, and 9c are schematic circuit diagrams of the document reading device and the record card punching machine connected thereto.

Figure 10:
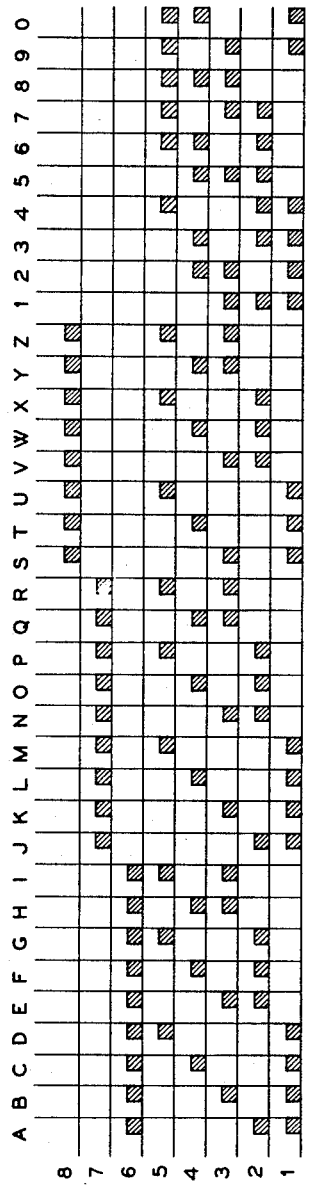

Fig. 10 shows the code configuration.

Figure 11:
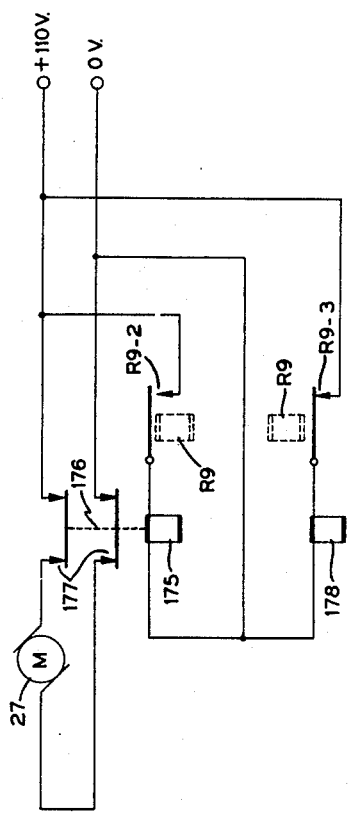

Fig. 11 is a schematic circuit diagram of the reading device drive means.

General description

As the means for moving and positioning the record relative to the sensing position forms no part of the present invention, it will be described only briefly. As stated previously, the record to be sensed for the purpose of this description is a paper tape having successive columns of information in the form of pierced holes along its length.

Figure 8A:
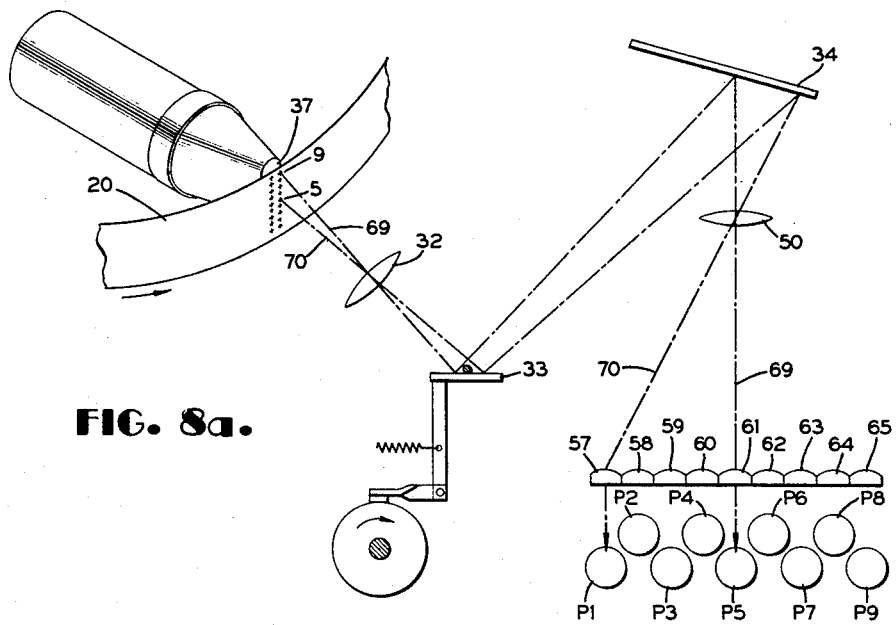
Figs. 8a and 8b are diagrammatic sketches of the sweep means.

As is shown in Fig. 10, the code selected to represent various symbols is an eight position code which permits use of three pierced holes in combination for each symbol. In considering the application of the code to the character A, for example, pierced holes are inserted in each of three index positions designated 1, 2 and 6. In addition thereto, each code symbol includes a pierced key-hole which is positioned in an area designated as index position 9 (Fig. 8a). As the description advances, the purpose of the key-hole will be explained fully.

Figure 1:
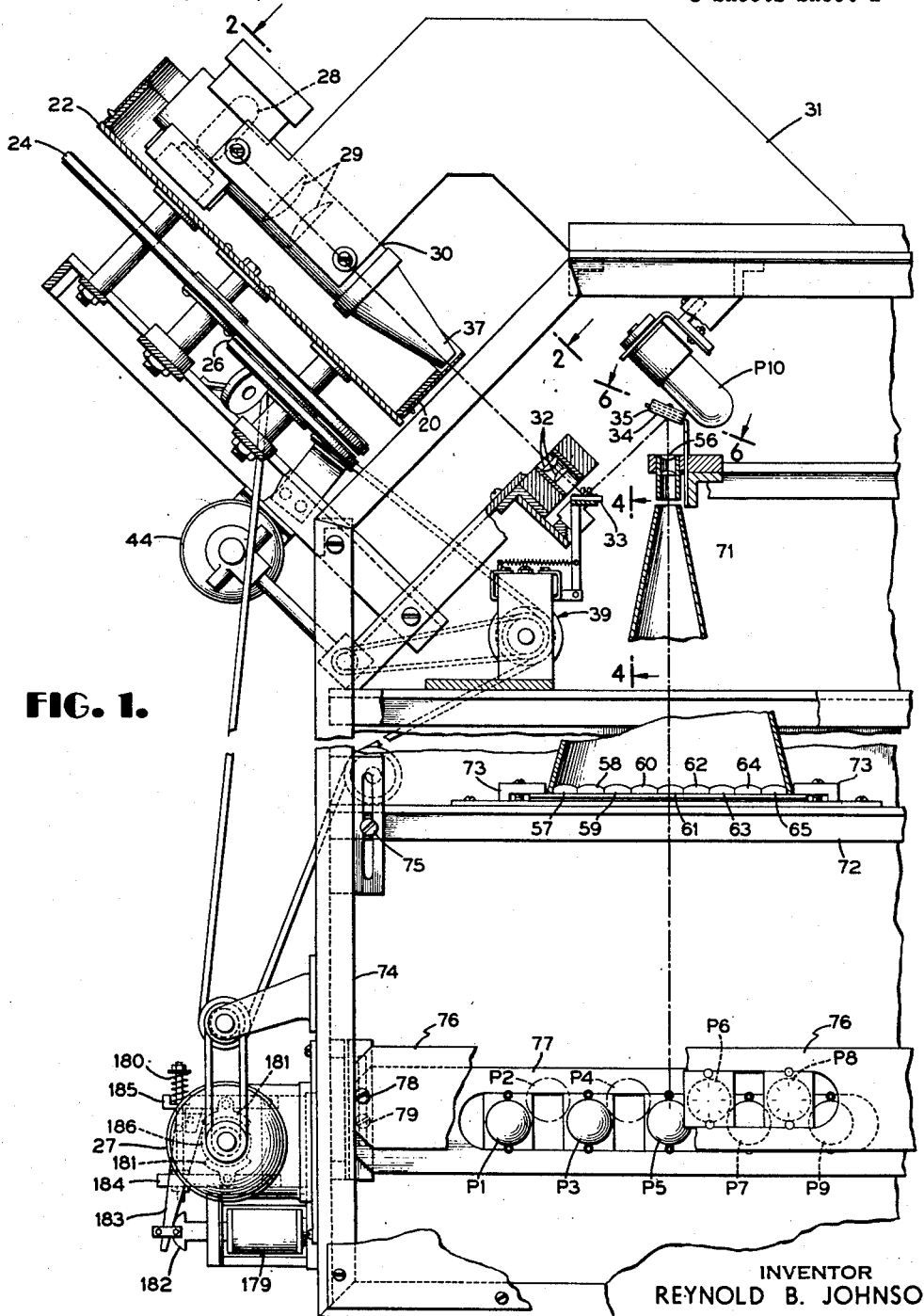
Fig. 1 is a fragmentary front elevation of the reading device with parts in section.
Figure 2:
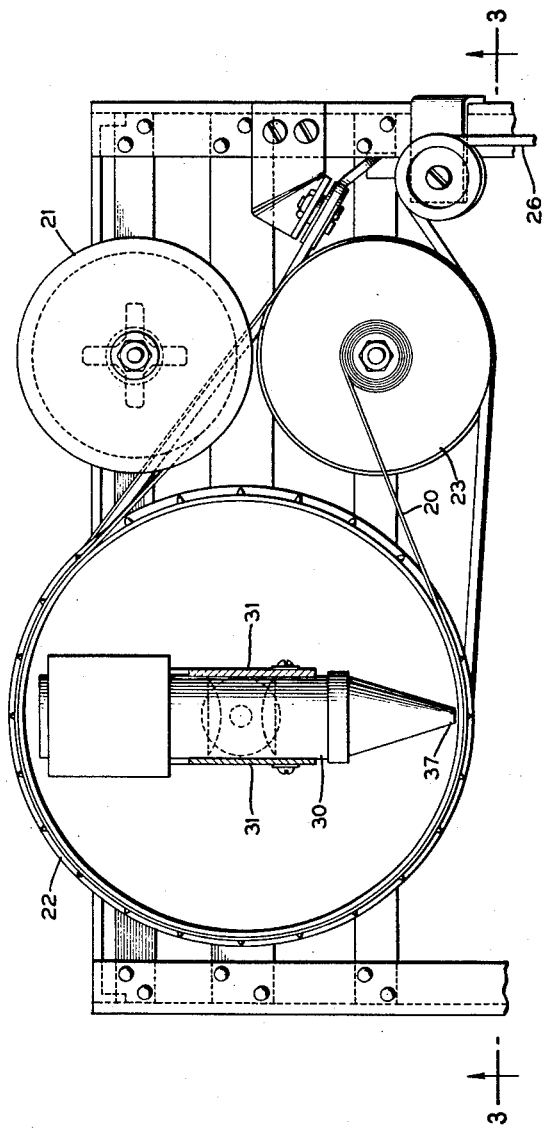
Fig. 2 is a cross sectional view along the plane 2—2 of Fig. 1.
Figure 3:
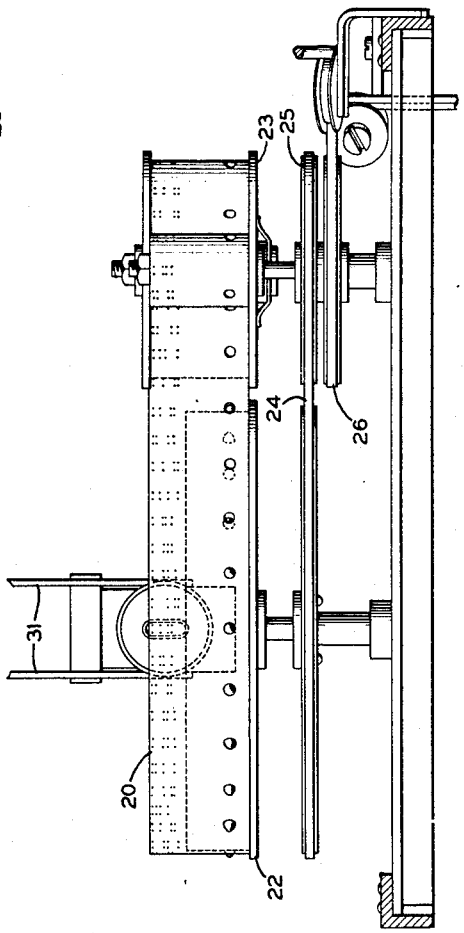
Fig. 3 is a cross sectional view along the plane 3—3 of Fig. 2.

Referring to Fig. 2, a tape 20 is fed from a tape reel 21 around a drum 22, onto a disc 23. In Fig. 3, the drum 22 is seen to be driven through a spring belt 24 by a pulley 25. The pulley 25 and disc 23 are driven through a belt 26 by drum motor 27 (Fig. 1).

As is shown in Fig. 1, a light source 28 and a pair of converging lenses 29 are mounted within a cylindrical casing 30 which is supported within tape drum 22 by a bracket 31 of the main frame. Said lenses 29 concentrate the rays of light emitted from source 28 into a narrow beam impinging upon a single columnar position of the portion of tape 20 in which information is pierced. The light rays transmitted through the pierced holes in tape 20 pass through a pair of converging lenses 32 and strike the reflecting surface of a pivotally mounted sweep mirror 33, whereupon the said rays are reflected toward a fixedly mounted one-half silvered member 34. The said member 34 is comprised of a reflecting element 35 and a transparent element 36 (Fig. 6). As tape 20 is fed by drum 22 past the sensing head 37, the said light rays traverse said mirror 34 from front to rear as shown in Fig. 1; i. e., in a direction from transparent element 36 to reflecting element 35 (Fig. 6). As a result of the foregoing, and due to the fact that element 36 (Fig. 6) is transparent, the said light rays will strike the cathode of control photoelectric tube P10 and thereby energize tube P10 until they reach the reflecting surface of element 35. The resulting absence of light rays at tube P10 will cause energization of a sweep magnet coil 38 (Fig. 5) in a manner to be explained in the circuit description. The coil 38 of sweep magnet 39 is arranged so that shaft 40, driven by a motor 44 (Fig. 1), may rotate within the said coil. Two discs 45 and 46 (Fig. 5), on either side of coil 38, are fixed to shaft 40. This permits shaft 40 and discs 45 and 46 to act as a core and pole pieces, respectively, for sweep magnet 39. An armature 47 connected at a pivot 48 to a connecting link 49 is attracted by resulting magnetic forces to the discs 45 and 46 when sweep coil 38 is energized. As discs 45 and 46 rotate in a clockwise direction, armature 47 is moved to the right as shown in Fig. 5. The extent of travel to the right by armature 47 when coil 38 is energized, is determined by an armature stop 50 slidably connected to sweep magnet frame 51 by locking screws 52.

The sweep mirror 33 is pivotally mounted at points 54 so that any motion of armature 47 transmitted by a lever arm 55 and connecting link 49 to sweep mirror 33 causes the said mirror to move correspondingly. As mirror 33 rocks in a counterclockwise direction about the said pivot points, the pattern of light rays representing the image of the code symbol being read, which is now reflected by element 35 and projected by the projection lenses 56 (Fig. 1) and the mosaic of converging lenses 57 to 65 toward the photoelectric sensing tubes P1 to P9, will be swept across the cathodes of said tubes P1 to P9. As the leading ray of light passing through the key-hole in index position 9 (Figs. 8a and 8b) in tape 20 strikes the cathode of key photoelectric tube P9, the remaining light rays will be focused on the cathodes of corresponding photoelectric sensing tubes P1 to P8 so that coacting sensing circuits are rendered operative. As the descriptions advances, it will become evident that the sensing circuits coacting with photoelectric tubes P1 to P9 are rendered operative only when the sweeping light rays are in register with the said tubes; i. e., when the light rays passing through pierced code holes impinge upon the cathodes of corresponding photoelectric tubes.

Referring to Fig. 5, when coil 38 is de-energized, the limit of movement to the left by armature 47 due to a mirror return tension spring 66, is determined by the position of armature stop 67 which is slideably connected to sweep magnet frame 51 by means of locking screws 68.

*Image sweep means*

Figure 8B:
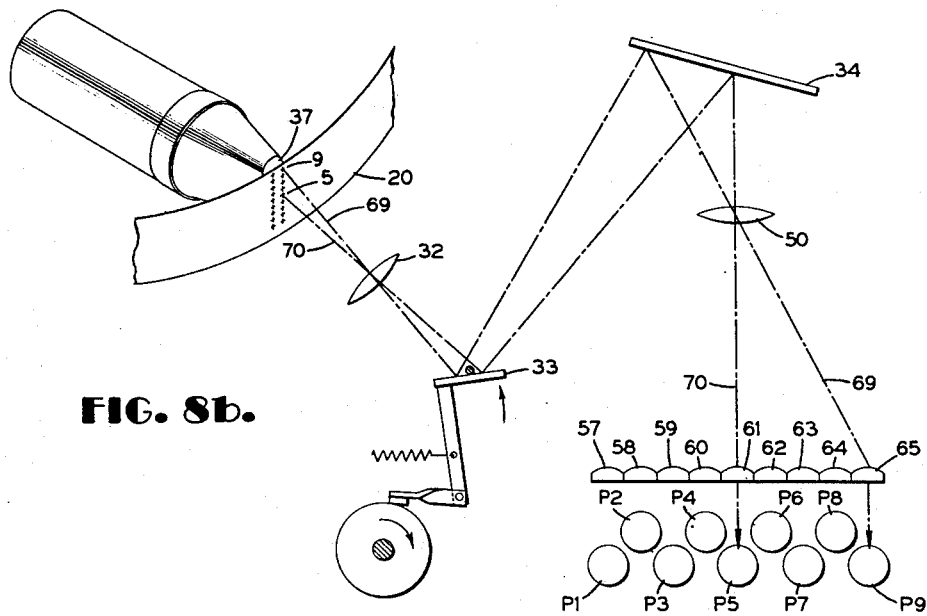

The code symbol image sweep means is provided so that the reading device analyzes correctly coded pierced hole combinations in tape 20 even through there may be a wide vertical variation in alignment of the said pierced hole combinations as they pass the sensing head 37 (Fig. 1). In order to amplify the purpose and operation of the image sweep means, attention is directed to the diagrammatic sketches shown in Figs. 8a and 8b. For the purpose of this explanation, the code symbol shown being read in Figs. 8a and 8b is comprised of only one code hole, i. e., the code hole in index position 5, and a key-hole in index position 9.

The key-hole light ray 69 and the five code-hole light ray 70 pass through pierced holes in index positions 9 and 5, respectively, in tape 20. Prior to the sweep (Fig. 8a) the said light rays may fall anywhere along the mosaic of converging lenses 57 to 69 depending upon the vertical misalignment of the code symbol. However, the sensing circuits coacting with photoelectric tubes P1 to P9 are maintained inoperative until key-hole light ray 69 strikes the cathode of tube P9. During the sweep of the code symbol image, i. e., as mirror 33 is rocked counterclockwise, the said sensing circuits are conditioned to be operative at the instant that light ray 69 strikes the cathode of tube P9. Due to the fact that a predetermined equidistant spacing exists between adjacent code symbol holes, and due to the fact that a corresponding predetermined spacing exists between adjacent tubes P1 to P9, all pierced hole light rays impinge upon the cathodes of their respective photoelectric tubes at the same time that the key-hole light ray strikes the cathode of tube P9. Thus, light rays 69 and 70 impinge upon the cathodes of tubes P9 and P5, respectively, simultaneously, and the image of the code symbol formed by the said light rays is described as being in register with the sensing photoelectric tubes.

The foregoing description shows the means and method used for compensating for any irregularity or misalignment in vertical disposition of the code symbol on tape 20. Means are also introduced for compensating for misalignment in horizontal disposition of the code symbol. This is accomplished by rendering the image sweep means operative only when the image of the code symbol reaches a predetermined position on half-silvered member 34; i. e., when the continuously traversing light rays pass onto reflecting element 35 and no longer energize photoelectric tube P10. Thus, the sweep of the light rays for each code symbol is started at the same relative time, and the image is positioned in register with the sensing photoelectric tubes P1 to P9 during a single rocking movement of sweep mirror 33. This will be described more fully in the circuit description.

*Optical system*

Two correlated major problems in photoelectric sensing, i. e., signal to non-signal ratio and scattered light, have been greatly improved upon by the optical system shown in Fig. 1, and as a consequence thereof, the sensitivity of the reading device has been greatly increased. The sensitivity of the device is such that pierced code holes equivalent to five percent of the normally 0.010 inch diameter full size code holes have been read successfully. This increased sensitivity has been accomplished by the design of an optical system in which elements shown in Fig. 1, i. e., condenser lenses 29, signal light lenses 32, mirror 33, member 34, projector lenses 56 and converging lenses 57 to 65, are positioned so that only a small portion of the light transmitted through the imperforate parts of tape 20 arrives at photoelectric tubes P1 to P9. By placing each lens 32 at a relatively great distance from sensing head 37, substantially all of the light rays passing through the perforate parts of tape 20 will be collected and further transmitted, whereas a bare minimum of the scattered light rays passing through the imperforate parts of tape 20 will be so collected and transmitted. Undistorted signals due to light passing through pierced code-holes is accomplished by using well-known multiplier type photoelectric tubes which amplify the signal within the same tube in which the signal is generated.

As is shown in Fig. 1, the mosaic of ray converging lenses 57 to 65 is enclosed by an opaque projection cone 71 and attached to a frame member 72 by clamps 73. Frame member 72 is attached to main frame 74 by locking screws 75 so that the member 72 can be moved vertically for adjustment purposes within the limits dictated by the slots through which screws 75 are inserted.

Member 72 is positioned so that the diameter of each spot of light on the ray converging lenses 57 to 65 is approximately one-half the diameter of the individual converging lens. Thus, such a spot of light may move in all directions within the limits of one ray converging lens by an amount equal to about fifty percent of one lens area. As a result of the foregoing, any slight dislocation of the document from its true sensing position whereby the code symbol being read is slightly askew with respect to the sensing position, is corrected by the mosaic of lenses 57 to 65.

Still referring to Fig. 1, the tubes P1 to P9 are shown to be contained within sockets on chassis members 76 and 77 which are attached to the main frame 74 by locking screws 78 and 79, respectively. The said chassis members may each be moved vertically for adjustment purposes within the limits dictated by the slots through which screws 78 and 79 are inserted. These chassis members are adjusted so that the individual spots of light representing the pierced code holes and focused by the lenses 57 to 65, impinge upon the cathodes of corresponding photoelectric tubes P1 to P9, respectively. This is an important adjustment in the event that a code configuration is used where the sensing photoelectric tubes P1 to P9 may be larger with respect to their cathodes than is the spacing between the pierced code holes in tape 20 with respect to the size of code holes; i. e., where the ratio of the external diameter of one photoelectric tube to the width of its cathode is greater than the ratio of the distance between adjacent code hole positions to the diameter of one code hole.

*Card punching apparatus*

As the card punching machine used to perforate the record cards forms no part of this invention and is shown connected to the reading device for illustrative reasons only, it will be described only briefly with reference to the electrical circuit shown in Figs. 9b and 9c within broken line 101. A detailed description of a substantially similar duplicating card punching machine may be found in U. S. Patent No. 1,976,618 issued to F. Lee et al.

Referring to Fig. 9b, when one or more duplicating magnet coils D1 to D12 are energized, punch magnet contact 150 is closed by mechanical latching means (not shown) in order to energize punch magnet coil 151. Energization of coil 151 causes a punching mechanism (not shown) to perforate the record card in accordance with the particular coils D1 to D12 that are energized. During operation of the punching mechanism, escapement contacts (upper) 144 and (lower) 152 are opened momentarily. In addition to the foregoing, contact 150 is opened by an unlatching mechanism (not shown) so as to de-energize coil 151. The energization and subsequent de-energization of coil 151 operates a spacing mechanism (not shown) which permits the card rack (not shown) and the record card contained therewith to advance one card column.

After the last column in the record card is punched, a card eject mechanism (not shown) removes the card from the punching machine card bed, and causes eject contact 153 to close in order to energize trip magnet coil 154. This actuates a mechanism (not shown) which transfers latch contact 155 (Fig. 9c) so that card feed motor 156 is energized thereby through the normally open points of contact 155. When motor 156 is rendered operative, a card feed mechanism (not shown) advances a new record card into the first columnar punching position. Thereafter, latch contact 155 is returned to its normal position and motor 156 is de-energized.

Brush relay coil 157 (Fig. 9b) is energized through normally closed duplicating cut-out contact 158 when door contact 159 is closed in order to actuate a mechanism (not shown) which moves the duplicating brushes 160 (Fig. 9c) toward the contact roll 161 so as to permit card punching to occur under control of a master card, as desired.

The circuit to cause record card punching under control of a master card may readily be seen by referring to Figs. 9b and 9c. As the master card is placed within the master card bed intermediate reading brushes 160 and contact roll 161, perforations in the master card permit the following circuit to be closed to duplicating magnets associated with corresponding master card perforations:

Starting at wire 165 of the punching machine line supply, through line switch 166, through escapement contact (lower) 152 via wire 167, through contact 155 normally closed (N/C) via wire 168, through contact roll 161, through one or more brushes 160 connected to the contact roll through punched holes in the master card, through duplicating magnets D1 to D12 associated with the master card punched holes, and through line switch 166 via wires 193 and 172, to wire 173 of the line supply.

It should be evident at this time that a record card being punched under control of a master card will have perforations therein corresponding to the master card perforations.

*Circuit description*

As stated hereinbefore, the movement of tape 20 relative to the sensing head 37 is such that successive pierced hole combinations permit rays of light emitted from source 28 to sweep across half-silvered member 34 from front to rear as shown in Fig. 1. It is to be remembered that the transparency of the leading element 36 (Fig. 6) of this half-silvered member permits the traversing light rays to strike cathode 85 of control photoelectric tube P10, shown in Fig. 9a, so as to render the said tube conductive until the light rays reach the reflecting surface of element 35.

A source of voltage including terminals 86, 87, 88 and 89 (Fig. 9a) affords suitable operating potentials; e. g., +150 volts, 0 volt, −150 volts and −1000 volts, respectively.

As the said light rays move from the transparent element 36 to reflecting element 35 (Fig. 1), the resulting absence of light energy at the control photoelectric tube P10 renders this tube non-conductive. This causes the potential at anode 90 to increase. Anode 90 is connected to a voltage divider which is comprised of resistors 91 and 92 in series circuit and connected, at one end, to +150 volt line 93, and, at the other end, to −150 volt line 94. Control grids 95 and 96 of tubes G9 and V10, respectively, are connected to a point intermediate resistors 91 and 92. Thus, the aforesaid voltage increase at anode 90 is transmitted to the said grids 95 and 96 so as to fire gas tube G9 and to render vacuum tube V10 conductive.

Due to the fact that control grid 97 of gas tube G10 is connected to anode 98 of tube V10 through resistors 99 and 100, the potential at grid 97 is decreased to a value beyond cut-off whenever tube V10 is rendered conductive, and remains at a value beyond cut-off during the entire period that tube P10 is energized. Gas tube G10, preferably a shield grid thyratron tube, continues to conduct notwithstanding the aforesaid control grid bias decrease. However, when gas tube G9, perferably a shield grid thyratron tube, fires, tube G10 is extinguished by a negative going impulse transmitted through commutating condenser C2 which is connected, at one end, to plate 105, and, at the other end, to plate 84. Tube G10 remains extinguished due to the aforesaid negative bias at grid 97.

Sweep magnet coil 38 which is connected in the plate circuit of tube G9, is energized when the said tube is conducting. Energization of coil 38 permits sweep mirror 33 to be rocked in a counterclockwise direction, as described hereinbefore, in order to cause the light rays passing through pierced code holes in tape 20 to sweep across photoelectric tubes P1 to P9 in the manner shown in Figs. 8a and 8b. When the key-hole light ray 69 impinges upon cathode 106 of key photoelectric tube P9 (Fig. 9a), the said tube is rendered conductive. This causes the potential at anode 107 to decrease. A voltage divider network consisting of resistors 108, 109 and 110 (Fig. 9b) is connected to anode 107 at a point intermediate resistors 108 and 109, and to grid 111 of vacuum tube V9 via a wire 112. Due to the foregoing, tube V9 is rendered non-conductive when tube P9 is energized, and the potential at plate 113 increases to a +150 volt value. This voltage increase is applied to each of the plates 114 within vacuum tubes V1 to V8 via resistors 115 and wire 116 (Fig. 9b), and is of such a magnitude as to condition the said tubes for conduction. As the description advances, it will be shown that each of the said tubes V1 to V8 is rendered conductive when tube V9 is rendered non-conductive only if a corresponding photoelectric tube P1 to P8 is not energized; i. e., if in tape 20 there are no code holes to permit incident light to impinge upon the respective cathodes of tubes P1 to P8, although there is a key-hole thereon to permit light to impinge upon cathode 106 of tube P9, all of the tubes V1 to V8 will be rendered conductive.

Due to the fact that the circuits associated with each tube V1 to V8 are similar in operation as well as electrical connection, it will be necessary to explain the circuit for tube V1 only. The grid voltage divider network of tube V1 comprising resistors 120 (Fig. 9a) and 121 (Fig. 9b), and potentiometer 122 in series circuit, is connected, at one end, to line 93 (Fig. 9a), and, at the other end, to line 94. Control grid 123 of tube V1 is connected to the aforesaid voltage divider network via resistor 124 and the movable arm 125 of potentiometer 122. So long as photoelectric tube P1 is not energized when tube V9 is rendered non-conductive by the energization of tube P9, the potential at grid 123 is of a value which permits tube V1 to conduct. However, when light rays passing through a pierced code-hole in position 1 strike cathode 126 of tube P1, this tube conducts, and the potential at its anode 127 (Fig. 9a) decreases. Anode 127 is connected intermediate resistor 120 and potentiometer 122. The aforesaid voltage decrease at anode 127 is sufficient to drive the grid potential of tube V1 beyond cut-off via the voltage divider network. As a result, vacuum tube V1 is rendered non-conductive.

In addition to conditioning tubes V1 to V8 for conduction when tube V9 is rendered non-conductive, the resulting voltage increase at plate 113 (Fig. 9a) is applied to a condenser C4 through a resistor 128. Condenser C4, in parallel circuit with resistor 129, is connected, at one end, intermediate resistors 134 and 135 via wire 136, and, at its other end, to plate 113 via resistor 128. Resistors 134 and 135 are connected in series circuit to the −150 volt line 94 and the zero volt line 137 so that condenser C4 receives a charge whose polarity is such that its positive terminal is connected to grid 138 of gas tube G11. As the description advances, the purpose of tube G11 will be explained more fully.

Due to the fact that the circuits associated with gas tubes G1 to G8, shown in the Fig. 9b, are similar except for any differences particularly specified herein, it will be necessary to explain only the circuit associated with tube G1. Cathode 140 and suppressor grid 141 of tube G1, preferably a shield grid thyratron tube, are connected to line 137 whereas plate 142 is connected to line 93 through resistor 143, relay coil R1, and normally closed escapement contact (upper) 144 which is located in the attached card punching machine. Control grid 145 of tube G1 is connected to plate 114 of tube V1. During the time that tube V1 is conducting, the voltage at plate 114 is of a decreased magnitude so as to bias grid 145 of tube G1 beyond cut-off. However, when tube V1 is rendered non-conductive in a manner described hereinbefore, the resulting increased magnitude of its plate potential is such as to render tube G1 conductive. During the time that tube G1 is conducting, relay coil R1 is energized. Tube G1 continues to conduct until its plate circuit is interrupted by escapement contact (upper) 144.

Referring to Fig. 9a, approximately 150 microseconds after condenser C4 starts to charge when tube V9 is rendered non-conductive, gas tube G11 fires. Relay coil R11 in the plate circuit of tube G11, preferably a shield grid tryratron tube, is energized while tube G11 is conducting. As shown in Fig. 9c, the energization of coil R11 causes normally open contact R11–1 to complete the relay checking circuit and the relay coding circuit.

Referring again to Fig. 9a, when tube G11 fires, the voltage drop across resistor 148 increases. Resistor 148 is connected, at one end, to the +150 volt line 93, and, at the other end, to the plate circuits of tubes G11 and V1 to V9 via coil R11, and wires 117 and 116, respectively. The aforesaid increased voltage drop across resistor 148 due to the energized condition of tube G11 causes the plate voltage of tube V9 to decrease. Due to the fact that plate 113 of tube V9 is connected to plates 114 of tubes V1 to V8 (Fig. 9b) via wire 116 and resistors 115, the increased voltage drop across resistor 148 causes the plate voltage of tubes V1 to V8 to decrease so as to bias tubes G1 to G8 beyond cut-off. Tube G11 continues to conduct until the next sweep cycle of mirror 33 (Fig. 1) in order to prevent any possibility of reading the same pierced hole code symbol a second time during the return of the sweep mirror.

In addition to the foregoing, when tube G11 fires, commutating condenser C3 which is connected, at one end, to plate 105 of tube G9, and, at the other end, to plate 149 of tube G11 through normally closed contact R9–1, extinguishes tube G9 momentarily. However, gas tube G9 does not remain extinguished at this time because its grid bias is sufficiently positive to permit conduction by the said tube.

After punching occurs in the attached card punching machine, escapement contact 144 (Fig. 9b) is opened, and thereupon extinguishes the gas tubes G1 to G8 that are conducting, by removing the plate supply voltage applied thereto.

Referring to Fig. 9a, sweep magnet coil 38 is de-energized when tube G9 is extinguished. This is brought about when light rays passing through a subsequent pierced hole code symbol energize photoelectric tube P10 as described hereinbefore so as to render tube V10 non-conductive. The resulting increase of voltage at plate 98 of tube V10 raises the grid bias of tube G10 sufficiently to fire tube G10. When tube G10 fires, a negative going impulse is transmitted through commutating condenser C2 in order to extinguish tube G9. Tube G9 remains non-conducting by reason of its negative grid bias which is maintained beyond cut-off so long as tube P10 is energized. During the time that tube G9 is non-conducting, sweep coil 38 remains de-energized.

As described hereinbefore, the absence of the constantly traversing light rays on the cathode of tube P10 permits tubes G9 and V10 to conduct. When tube G9 fires, tube G10 is extinguished by a negative going impulse through condenser C2, and tube G11 is extinguished by a negative going impulse transmitted through condenser C3. The said tubes G10 and G11 remain non-conducting until their grid bias is raised as described hereinbefore.

Relay coding circuit

As is shown in Fig. 9c, the relay coding contacts are arranged to complete a circuit to one or more duplicating magnets D1 to D12 so that columnar punchings in the record card are in accordance with corresponding pierced hole code symbols in the document being read. A circuit will be completed to the said duplicating magnets only if tape 20 contains any one of a number of predetermined three pierced hole code symbols shown in Fig. 10.

If, for example, tape 20 contains a pierced hole code symbol representing the character A which is comprised of pierced holes in index positions 1, 2 and 6, light rays passing through the said holes and a keyhole in index position 9 will impinge upon the cathodes of photoelectric tubes P1, P2, P6 and P9 simultaneously. This will permit relay coils R1, R2 and R6 to become energized in a manner described hereinbefore. When coils R1, R2 and R6 are energized, and after relay coil R11 is energized, the following circuits to energize corresponding duplicating magnet coils D1 and D12 concurrently are completed so as to perforate the record card in accordance with the significance of the code symbol:

Starting at wire 165 of the card punching machine line supply (Fig. 9b), a circuit is completed to energize coil D1 through line switch 166, through escapement contact (lower) 152 via wire 167, through contact R11–1 (Fig. 9c) via wire 168, through contact R1–1 normally open (N/O) via wire 169, through contact R2–2 N/O, through contact R3–3 N/C, through contact R4–3 N/C, through contact R5–3 N/C, through contact R8–2 N/C, through contact R7–2 N/C, through contact R6–2 N/O, through contact R1–2 N/O via wire 190, through contact R2–3 N/O, through contact R4–6 N/C, through contact R5–8 N/C, through duplicating coil D1 (Fig. 9b) via wire 191, through bus bar 192, and through line switch 166 via wires 193 and 172, to wire 173 of the punching machine line voltage supply.

A parallel circuit to the aforedescribed circuit is also completed in order to energize duplicating magnet coil D12. Starting at contact R1–1 (Fig. 9c), through contact R1–1 N/O, through contact R2–2 N/O, through contact R3–3 N/C, through contact R4–3 N/C, through contact R5–3 N/C, through contact R8–2 N/C, through contact R7–2 N/C, through contact R6–2 N/O, through contact R6–6, through duplicating coil D12 (Fig. 9b) via wire 194, through bus bar 192, through line switch 166 via wires 193 and 172, to wire 173 of the voltage supply.

Due to the simultaneous energization of duplicating magnet coils D1 and D12, the card punching machine will perforate the record card in a single column at record card index positions 1 and 12, thereby designating the character A on the record card in the well-known IBM alphabetical code.

Relay checking circuit

The preferred code configuration shown in Fig. 10 requires a predetermined combination of three pierced code holes for each character; any number of code holes other than three is designated by a checking circuit as an error. The effect of this error will cause the following to occur: (a) Stop further advancement of tape 20; (b) Prevent operation of the card punching machine so that the record card in the punching machine is not perforated erroneously; (c) Energize either glow tube CC1 or CC2 in order to visually indicate to the operator the type of error.

The relay checking circuit shown in Fig. 9c includes the contact straps of code relays R1 to R8 (Fig. 9b) which are arranged so that if more than, or less than, three code relays are energized simultaneously, an error circuit will be completed to the "over" glow tube CC2 or the "under" glow tube CC1, respectively. In addition thereto, relay coil R9 will be energized so that contact R9–1 (Fig. 9a) opens the tube G11 extinguishing circuits, contact R9–2 (Fig. 11) opens the circuit to drive motor 27, and contact R9–3 (Fig. 11) opens the circuit to brake magnet coil 178.

An "under" error will result if a single code symbol includes fewer than three pierced code holes; e. g., code holes in index positions 1 and 2. Thus, when sweep magnet coil 38 is energized, the sweeping light rays passing through the aforestated code holes and a key-hole in index position 9, will energize tubes P1, P2 and P9 simultaneously, and thereby cause the energization of relay coils R1 and R2.

When the coils R1 and R2 are energized, and after relay coil R11 (Fig. 9a) is energized, the following circuit is completed to energize relay coil R9 and glow tube CC1:

Starting at wire 165 of the punching machine line supply shown in Fig. 9b, through line switch 166, through escapement contact (lower) 152 via wire 167, through contact R11–1 (Fig. 9c) via wire 168, through contact R1–1 N/O, via wire 169 through contact R2–2 N/O, through contact R3–3 N/C, through contact R4–3 N/C, through contact R5–3 N/C, through contact R8–2 N/C, through contact R7–2 N/C, through contact R6–2 N/C, through tube CC1, through relay coil R9 via wire 171, and through line switch 166 (Fig. 9b) via wire 172, to wire 173 of the punching machine voltage supply.

An "over" error will result if a single code symbol includes more than three pierced code holes; e. g., code holes in index positions 1, 2, 3 and 4. Thus, when sweep magnet coil 38 is energized, the light rays passing through the aforestated code holes and a key-hole in index position 9, will energize tubes P1, P2, P3, P4 and P9 simultaneously and thereby cause the energization of relay coils R1, R2, R3 and R4.

When the coils R1, R2, R3 and R4 are energized, and after relay coil R11 (Fig. 9a) is energized, the following circuit is completed to energize relay coil R9 and glow tube CC2:

Starting at wire 165 of the punching machine line supply shown in Fig. 9b, through line switch 166, through escapement contact lower 152 via wire 167, through contact R11–1 (Fig. 9c) via wire 168, through contact R1–1 N/O, through contact R2–2 N/O, through contact R3–3 N/O, through contact R4–4 N/O, through CC2 via wire 174, through relay coil R9 via wire 171, and through line switch 166 (Fig. 9b) via wire 172, to wire 173 of the punching machine voltage supply.

Due to the fact that neither the "over" error condition nor the "under" error condition permits a circuit to be completed by which any of the coils D1 to D12 may be energized, the punching machine will not perforate the record card.

As is shown in Fig. 11, motor control magnet coil 175 is energized when contact R9–2 closes and solenoid plunger 176 is attracted downwardly thereby so as to open the said motor line contacts 177 in the circuit to drive motor 27 (Fig. 1).

In order to stop the advancement of tape 20 suddenly when an error occurs, brake magnet coil 178 is de-energized when contact R9–3 opens. A brake 179 (Fig. 1), controlled by coil 178, stops tape 20 so that the code symbol which is subsequent to the erroneously pierced code symbol does not go beyond sensing head 37.

As the solenoid-type electric brake 179 is of a commercial type well known to those persons familiar with the electrical art, and as the said brake forms no part of this invention, it will be described briefly. Referring to Fig. 1, spring 180 causes brake shoes 181 to brake the disc 186 fixedly attached to the shaft of motor 27 so long as coil 178 is not energized. Upon energization of coil 178, the magnetic field set up by coil 178 causes plunger 182 to move to the right, whereby lever 183 is pivoted counterclockwise. This causes the extended members 184 and 185 to move against the action of spring 180, and thereby free the aforesaid motor disc 186 from the brake shoes 181.

In order to start the reading device after an error occurs, it is necessary for the operator to depress a space key (not shown) or a character key (not shown) on the keyboard of the punching machine. The depression of a space key causes a mechanical linkage to momentarily close contact 150 (Fig. 9b). This will cause the spacing mechanism to operate as described hereinbefore. The depression of a character key causes a mechanical linkage to momentarily close contact 150 only after interposers set up the punching mechanism to perforate the record card in accordance with the key that is depressed.

The operation of the punching machine by depressing any key as described in the preceding paragraph allows escapement contact (upper) 152 to open and de-energize relay coil R9 (Fig. 9c). As is shown in Fig. 11, the transfer of contacts R9-2 and R9-3 to their normal position allows motor 27 to operate and tape 20 to advance once again. As is shown in Fig. 9a, the return of contact R9-1 to its normally closed position closes the extinguishing circuit for tube G11 so that the said tube will be rendered non-conductive when tube G9 fires.

Résumé

As the pierced hole code symbols on the record being read are moved singly and successively past the sening head 37 (Fig. 1), incident light rays are caused to traverse member 34 in a direction from transparent element 36 to reflecting element 35. When the light rays impinge upon reflecting element 35 and no longer pass through transparent element 36 so as to energize photoelectric tube P10, the de-energization of tube P10 completes an electric circuit whereupon sweep magnet 39 (Fig. 1) is rendered operative. This action causes a rocking movement to be imparted to sweep mirror 33. As a result of this rocking movement, and due to the fact that the light rays are reflected by element 35 towards the photoelectric tubes P1 to P9, the light rays are caused to sweep the said tubes P1 to P9. When, during this sweeping action, the light rays, i. e., the image of the pierced hole code symbol, are moved into register with corresponding tubes P1 to P9, storage circuits and work circuits associated with the said tubes are rendered effective. For illustrative purposes, the embodiment described herein includes a record card punching machine. It will be evident to those persons familiar with the art that the use of a punching machine is not a limitation; other type machines, printers for example, may be adapted for use with the reading device equally as well.

When a succeeding pierced hole code symbol is moved to a position relative to sensing head 37 (Fig. 1) so that the light image thereof energizes photoelectric tube P10, sweep magnet 39 is rendered inoperative. This permits sweep mirror 33 to be returned to its home position in readiness for the next rocking movement to effect a sweep of tubes P1 to P9 by the said image. In addition thereto, the storage circuits and the work circuits are cleared so as to be placed in readiness for the succeeding code symbol.

In between the storage circuits and the work circuits are relay checking circuits and coding circuits. The checking circuits are used to check each code symbol to the extent that there are a predetermined number of pierced holes in each code symbol. The coding circuits are used to translate the code configuration of the record reading device to the code configuration adapted to control the machine connected to the said device. In the embodiment described herein, the relay coding circuits translate the code configuration shown in Fig. 10 to the well-known IBM alphabetic code configuration.

While there have been shown and described and pointed out the fundamental novel features of the invention as applied to a preferred embodiment, it will be understood that various omissions and substitutions and changes in the form and details of the device may be made by those skilled in the art, without departing from the spirit of the invention. It is the intention, therefore, to be limited only as indicated by the scope of the following claims.

What is claimed is:

1. In a device for reading a record having code symbols thereon, a mirror, a source of radiant energy for projecting an image of each one of said code symbols upon said mirror, means for advancing said record, means for detecting an advancement of said record corresponding to the spacing between adjacent code symbols, means for sensing radiant energy, means for moving said mirror to cause the mirror-image of each one of said code symbols to scan said sensing means, means governed by said detecting means for controlling said mirror moving means, and means for detecting the arrival of said mirror-image of each one of said code symbols in register with said sensing means.

2. In a device for reading a record having code symbols thereon, a mirror, a source of radiant energy for projecting an image of each one of said code symbols upon said mirror, means for sensing radiant energy, means for continuously advancing said record so that the mirror-image of each one of said code symbols scans said sensing means in one direction, means for detecting an advancement of said record corresponding to the spacing between adjacent code symbols, means for moving said mirror so that said mirror-image of each one of said code symbols scans said sensing means in a second direction, means governed by said detecting means for controlling said mirror moving means, and means for detecting the arrival of said mirror-image of each one of said code symbols in register with said sensing means.

3. In a device for reading a record having data designations thereon, a source of radiant energy adapted to direct radiant energy upon said record to produce an image of said data designations, a first mirror, a second mirror for producing a mirror-image of said data designations upon said first mirror, means to cause a relative motion of said record and said source of radiant energy to cause said mirror-image to move in one direction, means operative in response to the arrival of said mirror-image at a certain point on said first mirror in said one direction for moving said second mirror to cause said mirror-image to move in a different direction, and means responsive to said radiant energy and located so as to intercept an image of said mirror-image when it arrives at a certain point along said different direction.

4. An apparatus of the class described for reading a record with code symbols thereon comprising a pivotally mounted mirror and a plurality of radiant energy sensitive elements having, in combination, means for continuously advancing said record, means for projecting an image, by radiant energy, of each one of said code symbols upon said mirror, means for rocking said mirror whereby the mirror-image of each one of said code symbols sweeps said elements, and control means for rendering said rocking means operative when each one of said code symbols advances to a predetermined position.

5. An apparatus as set forth in claim 4 additionally comprising means for governing said control means to cause the mirror-image of each one of said code symbols to be positioned in register which said elements during a single rocking movement of said mirror.

6. An apparatus as set forth in claim 4 additionally comprising storage means responsive to said radiant energy when the mirror-image is in register with said elements.

7. A device of the class described having, in combination, a source of data manifesting radiations, a mirror for reflecting said radiations, means for causing said radiations to move in one direction, means for rocking said mirror to cause the reflected radiations moving in said one direction to move in a different direction, and means for effecting said rocking means in response to the arrival of the reflected radiations at a predetermined point in said one direction.

8. In a device for reading a record having data designations thereon, a source of radiant energy adapted to direct radiant energy upon said record to produce an image of said data designations, a member consisting of a non-reflecting material disposed contiguously with a reflecting material, means to cause a relative motion of said record and said source of radiant energy so that said image moves in one direction from said non-reflecting material to said reflecting material, means operative in response to the crossing of said image from said non-reflecting material to said reflecting material for causing said image to move in a different direction, and means responsive to said radiant energy and located so as to intercept said image when it arrives at a certain point along said different direction.

9. In a device for reading a record having data designations thereon, a source of radiant energy adapted to direct radiant energy upon said record to produce an image of said data designations, a member consisting of a non-reflecting material disposed contiguously with a reflecting material, means including a pivotally mounted mirror for projecting an image, by radiant energy, of each one of said code symbols upon said member, means for causing a relative motion of said record and said source of radiant energy to cause said image to move in a single direction from said non-reflecting material to said reflecting material, means for rocking said mirror to cause said image moving in said single direction to move in a different direction, and means responsive to the crossing of said image from said non-reflecting material to said reflecting material for causing an operation of said rocking means.

10. In a device of the class described for analyzing designations of a code symbol on a record, a source of radiant energy for projecting data manifesting radiations representing said designations upon a plurality of radiant energy sensitive targets, means for deflecting said radiations along one axis of a plane coordinate system, means for deflecting said radiations concurrently thereto along the other axis of the plane coordinate system, and electrical means for emitting a signal when said radiations are in register with said targets.

11. A device as set forth in claim 10 additionally comprising a mosaic of lenses for separately focusing each of said radiations representing said designations onto a corresponding target.

12. In an apparatus of the class described for reading a record having code symbols thereon, said code symbols each comprising designations arranged substantially along a first axis of a plane coordinate system, a light source for projecting data manifesting radiations representing said designations onto a pivotally mounted mirror, means for causing a relative motion of said record and said light source to deflect said radiations along a second axis of the plane coordinate system, a plurality of light sensitive targets positioned along said first axis, and means for rocking said mirror at a predetermined time so as to deflect said radiations along said first axis, whereby said radiations are positioned in exact registration with corresponding targets during a single rocking movement of said mirror.

13. In a device of the class described for reading a record having perforate code symbols thereon, a light source for transmitting light radiations through said document, a pivotally mounted mirror arranged to receive light radiations being transmitted through said record as modified by said code symbols, a light sensitive receiver arranged to receive a mirror-image of said code symbols being reflected from said mirror, means for advancing said record along one axis of a plane coordinate system thereby deflecting said mirror-image along said one axis, means for rocking said mirror so as to deflect said mirror-image along the other axis of the plane coordinate system, means for rendering said rocking means operative in response to the arrival of said mirror-image at a certain point along said one axis, and means for detecting the arrival of said mirror-image in register with said receiver.

14. In a device of the class described for reading a record having perforate code symbols thereon, a light source for transmitting light radiations through said perforate code symbols, a pivotally mounted mirror arranged to receive light radiations being transmitted through said perforate code symbols, a plurality of light sensitive targets arranged to receive a mirror-image of said perforate code symbols being reflected from said mirror, means for advancing said record along one axis of a plane coordinate system thereby deflecting said mirror-image along said one axis, means for rocking said mirror so as to deflect said mirror-image along the other axis of the plane coordinate system, and means for detecting the arrival of said mirror-image in register with said targets.

15. A device of the class described having in combination with sensing means responsive to data manifesting radiations in register therewith, means for transmitting said radiations, means operative in response to said radiations to cause a relative motion of said radiations and said sensing means, and means controlling said sensing means for detecting the advent of said radiations in register with said sensing means.

16. In a device for reading a record having code symbols thereon, each one of said code symbols including data designations and a control designation, a source of radiant energy adapted to direct radiant energy upon said record to produce an image of said data designations and said control designation, a sensing element responsive to said radiant energy, other radiant energy sensing means, means to direct said image toward said other sensing means and said sensing element, and an electric circuit including said sensing element to trigger said other sensing means so as to render said other sensing means responsive to said radiant energy when said sensing element intercepts the image of said control designation.

17. In a device for sensing data manifesting radiations consisting of a plurality of datum manifesting radiations; means for detecting said datum radiations one by one; a pivotally mounted mirror for reflecting said datum radiations; sensing means arranged to be responsive to a mirror-image of said datum radiations in register therewith; means for rocking said mirror a predetermined amount so as to cause said mirror-image to sweep between two fixed limits, and into and out of register with said sensing means; and means governed by said datum detecting means for controlling said mirror rocking means so as to effect a mirror-image sweep between said fixed limits for each of said datum manifesting radiations.

References Cited in the file of this patent
UNITED STATES PATENTS

| 2,594,358 | Shaw | Apr. 29, 1952 |
| 2,600,168 | Klyce | June 10, 1952 |
| 2,720,810 | Senn | Oct. 18, 1955 |